United States Patent
Dobbs et al.

(10) Patent No.: US 7,908,789 B2
(45) Date of Patent: Mar. 22, 2011

(54) CONTAINER WITH SCENTED INTERIOR

(76) Inventors: John Brandon Dobbs, Dallas, TX (US); Robert Ashley Dobbs, Richardson, TX (US)

( * ) Notice: Subject to any disclaimer, the term of this patent is extended or adjusted under 35 U.S.C. 154(b) by 868 days.

(21) Appl. No.: 11/156,355

(22) Filed: Jun. 17, 2005

(65) Prior Publication Data

US 2005/0229475 A1    Oct. 20, 2005

Related U.S. Application Data

(63) Continuation of application No. 10/684,919, filed on Oct. 14, 2003, now abandoned, which is a continuation of application No. 10/196,901, filed on Jul. 16, 2002, now abandoned.

(60) Provisional application No. 60/306,051, filed on Jul. 17, 2001.

(51) Int. Cl.
*A01K 97/04* (2006.01)

(52) U.S. Cl. .............................................. 43/55; 43/54.1

(58) Field of Classification Search .................... 43/1, 4, 43/25.2, 54.1, 55, 56, 57.1
See application file for complete search history.

(56) References Cited

U.S. PATENT DOCUMENTS

| 5,297,354 | A | * | 3/1994 | McGriff | 43/4 |
| 5,632,113 | A | * | 5/1997 | Raymond et al. | 43/54.1 |
| 5,707,696 | A | * | 1/1998 | Boxler | 428/36.5 |
| 6,024,767 | A | * | 2/2000 | Telesca et al. | 8/142 |

FOREIGN PATENT DOCUMENTS

| JP | 11-198287 | * | 7/1999 |
| WO | WO 98/30621 | * | 7/1998 |

* cited by examiner

*Primary Examiner* — David J Parsley
(74) *Attorney, Agent, or Firm* — Dunlap Codding, P.C.

(57) ABSTRACT

A container and method for storing and imparting a scent to an object. The container having an outer layer formed to define an object receiving space and fabricated of a moisture and gas barrier material. The container further having an inner scented layer having a scent incorporated therein such that, upon an object being disposed in the object receiving space, the scent of the inner scented layer is imparted to the object while the outer layer serves as a barrier to prevent surrounding objects from being contaminated with the scent.

3 Claims, 1 Drawing Sheet

CONTAINER WITH SCENTED INTERIOR

CROSS-REFERENCE TO RELATED APPLICATIONS

This application is a continuation of U.S. Ser. No. 10/684,919, filed Oct. 14, 2003, now abandoned which is a continuation of U.S. Ser. No. 10/196,901, filed Jul. 16, 2002, now abandoned, which claims the benefit of U.S. Provisional Application Ser. No. 60/306,051, filed Jul. 17, 2001, the contents of each hereby expressly incorporated herein by reference.

BACKGROUND OF THE INVENTION

1. Field of the Invention

The present invention is generally related to a container, and more particularly, but not by way of limitation, to an improved container having a scented interior for dispersing a scent on an object stored in the container.

2. Brief Description of Related Art

"Fish attractants" are scented compositions applied to fish baits in an effort to stimulate fish into keeping the bait in its mouth for a longer period of time after they have taken the bait. The fish attractants are typically in the form of a liquid, gel, paste, or solid and applied to the bait by the angler prior to casting the bait into the water.

One of the problems experienced when using fish attractants is the mess associated when applying the fish attractant to the bait. In the process of applying fish attractant to the bait, some of the fish attractant also gets applied to the angler's hands and clothing leaving the angler with an unpleasant odor. In addition, during the application process, a significant portion of the fish attractant is wasted in that an excess amount of the fish attractant is often applied to the fish bait.

To this end, a need exists for a container for storing fish baits which will disperse a fish attractant scent onto the fish bait when the fish bait is stored within the container. It is to such a container that the present invention is directed.

DETAILED DESCRIPTION OF THE INVENTION

Figure 1:
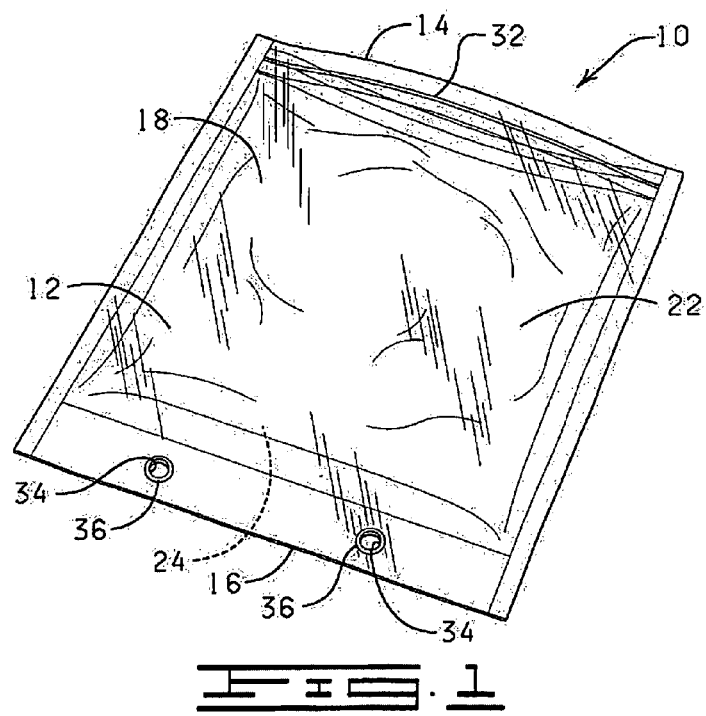
FIG. 1 is a perspective view of a container constructed in accordance with the present invention shown in an open state.
Figures 2, 3:
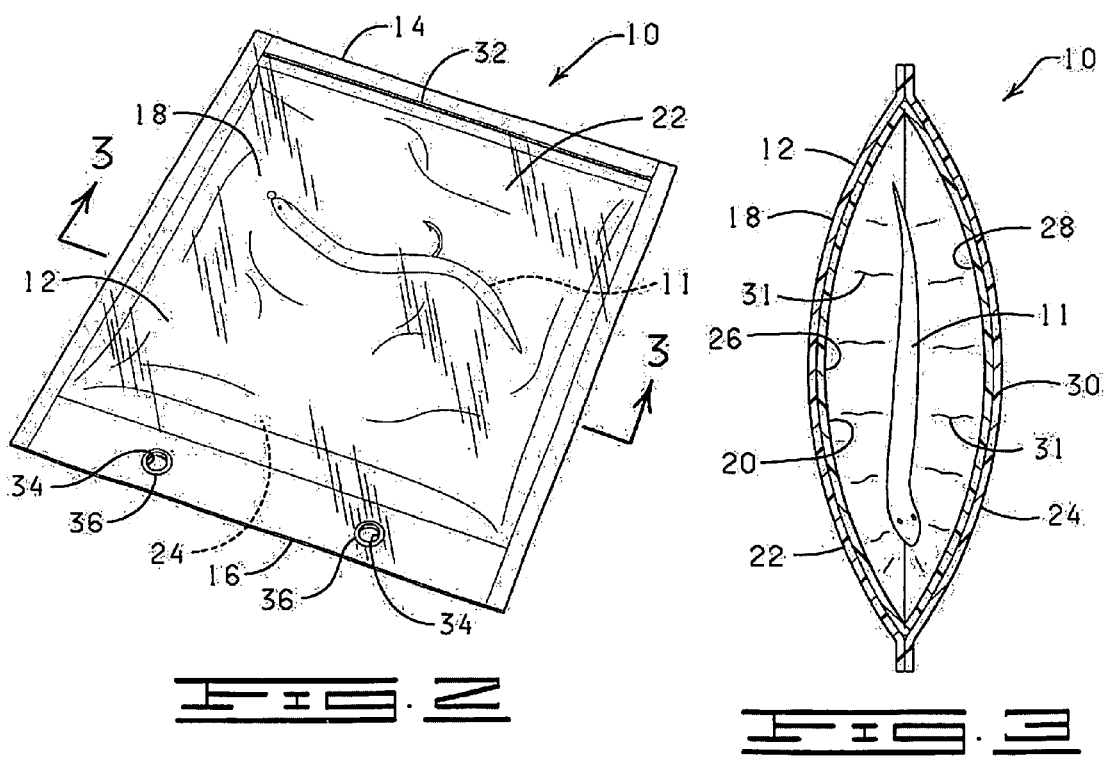
FIG. 2 is a perspective view of the container of FIG. 1 shown in a closed state with a fish bait shown disposed therein
FIG. 3 is a cross-section taken along line 3-3 of FIG. 1.

Referring now to the drawings, and more particularly to FIGS. 1 and 2, a container 10 constructed in accordance with the present invention is shown. The container 10 is adapted for storing a fish bait 11, such as a plastic fishing lure, and imparting a fish attractant scent to the fish bait 11 thereby eliminating the need of a fisherman having to repeatedly apply a fish attractant to the fish bait 11.

The container 10 is shown herein to be in the form of a flexible bag having a sidewall 12, an access opening 14, and a closed lower end 16. The sidewall 12 is characterized as having an outer surface 18 and an inner surface 20 and comprises a first side 22 and a second side 24. The container 10 is shown in an open state in FIG. 1 and in a closed state in FIG. 2. In the open state, the fish bait may be disposed in an object receiving space 26 (FIG. 3) of the container 10. The object receiving space 26 is surrounded by the inner surface 20 of the sidewall 12 and is accessible through the access opening 14 of the container 10. A portion of the closed lower end 16 of the container 10 may be inwardly folded to form one or more gussets (not shown).

In the open state, the container 10 may be straight, tapered or may assume various shapes and configurations, such as cylindrical, frusto-conical, coniform, and combinations thereof, so long as the container 10 functions in accordance with the present invention in the manner described herein.

As best illustrated in FIG. 3, the container 10 includes an inner scented layer 28 and an outer barrier layer 30 which is laminated to the inner scented layer 28 so that a scent incorporated in the inner scented layer 28, and depicted in FIG. 3 by dispersing lines 31, is encapsulated within the container 10 when the container 10 is in the closed state (FIGS. 2 and 3). In one embodiment, a scented compound, suitable for use as a fish attractant, is blended with a polymeric material, such as a low density polyethylene, at a ratio of about 10 to about 40 weight percent. The mixture is then extruded into a film having a thickness in a range from about four mils to about ten mils using a blown film process or any other conventional film extruding process, such as cast film extrusion or thin film extrusion. The resulting film is then folded, cut, and sealed to provide the desired size and shape of the container.

The outer barrier layer 30 is laminated to the inner scented layer 28 in a conventional manner such as by heat sealing or other conventional film laminating methods. A closure member 32 is next applied to the access opening 14 of the container 10 to permit the container 10 to be selectively opened and closed. The closure member 32 is shown to be a zipper type closure; however, the closure member 32 can also be adhesive, tape, ties, or a combination thereof. Finally, a plurality of spaced apart openings 34 are formed near the closed lower end 16 of the container 10 to permit the container 10 to be secured in a ring binder carrying case (not shown). Each of the holes 34 may be reinforced with a grommet 36.

The scented compound used in forming the inner scented layer 28 can be any scented compound suitable for film extrusion. A suitable compound is available from RTP Company and is referred to as RTP 799 X 93511 B SS-94537 garlic compound. Besides garlic, other scents or fragrances which are commonly used as fish attractants include shad, crawfish, anise, and salt, by way of example.

The inner scented layer 28 has been described as being fabricated of a low density polyethylene. However, it will be appreciated that the inner scented layer 28 may also be fabricated of other polymeric materials including high density polyethylene (HDPE), linear low density polyethylene (LLDPE), oriented polypropylene (OPP), biaxially oriented polypropylene (BOPP), cast polypropylene (CPP), ethyl vinyl acetate (EVA), polyvinyl choride (PVC), polyvinylidene chloride (PVDC), ethylene vinyl alcohol (EVOH), polystyrene (PS), or polyethylene terephthlate (PET). Also, synthetic polymers such as polypropylene or polyethylene as well as naturally occurring polymers such as cellophane could be used depending on the properties desired for the container 10.

The outer barrier layer 30 is fabricated of a suitable moisture and gas barrier material, such as a foil or a nanocomposite plastic film.

In use, a fisherman selects the container 10 having the desired inner scented layer. The fisherman then opens the container 10 and places the fish bait 11 into the container 10 and closes the container 10 with the closure member 32. While the fishing bait 11 is disposed in the container 10, the scent 31 disperses from the inner scented layer 28 and is imparted to the fish bait 11 which absorbs the scent 31 thereby ensuring that fish bait 11 has a continuous application of fish attractant. While the fish bait 11 is absorbing the scent 31 in the inner retaining space 20 of the container 10, the outer barrier layer 14 prevents surrounding objects from being contaminated with the scent 31 and thus eliminates the mess and unpleasant odor typically associated with fish attractants.

It will be appreciated by those of ordinary skill in the art that the container 10 can be formed with a variety of different scents whereby the container 10 can be used for storing a variety of different objects to which it is desirable to apply a scent, whether the scent be generally pleasant or unpleasant. For example, a container constructed in accordance with the present invention can be utilized to store objects such as potpourri.

It will also be appreciated by those of ordinary skill in the art that the inventive concept need not be limited to a bag structure, but a container having an inner scented layer and an outer barrier layer can be formed of a thermoplastic material whereby the container includes a relatively rigid tub portion and a corresponding lid portion. The tub portion can be formed to have an inner scented layer and an outer barrier layer whereby objects can be placed in the tub portion and covered with the lid portion so that the scent of the inner scented layer is absorbed by the contents of the container while the objects are sealed in the container.

From the above description, it is clear that the present invention is well adapted to carry out the objects and to attain the advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and claimed.

What is claimed is:

1. A method of storing and imparting a scent to a fish bait, comprising:
    unsealing a sealed a container having an outer layer fabricated of a moisture and gas barrier material and an inner scented layer comprising a film extruded from a mixture of a polymeric material and a compound scented with a fish attractant such that the inner scented layer has a fish attractant scent that disperses from the inner scented layer without manipulation of the container;
    positioning the fish bait in the container;
    resealing the container to encapsulate the fish bait and the fish attractant scent in the container;
    storing the fish bait in the container for a period of time sufficient to permit the fish attractant scent of the inner scented layer to disperse from the inner scented layer without manipulation of the container and to be imparted to the fish bait while the outer layer serves as a barrier to prevent surrounding objects from being contaminated with the fish attractant scent;
    unsealing the container and removing the scented fish bait from the container; and
    resealing the container to encapsulate the fish attractant scent.

2. The method of claim 1 wherein in the step of providing the container each of the outer layer and the inner scented layer is fabricated of a flexible material.

3. The method of claim 1 wherein the storing step further comprises the step of securing the container to a ring binder carrying case.

* * * * *